M. A. ROLLMAN.
FOOD CHOPPER.
APPLICATION FILED OCT. 11, 1911.
1,068,821. Patented July 29, 1913.
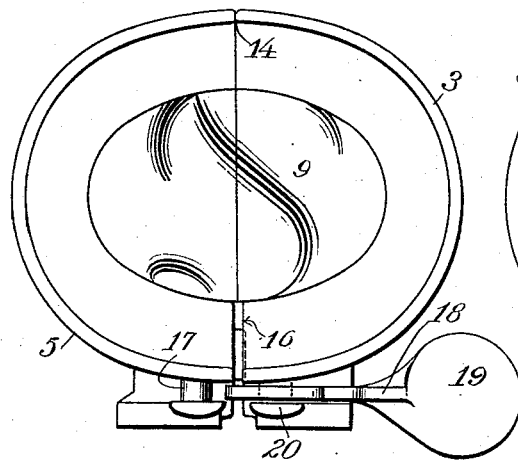
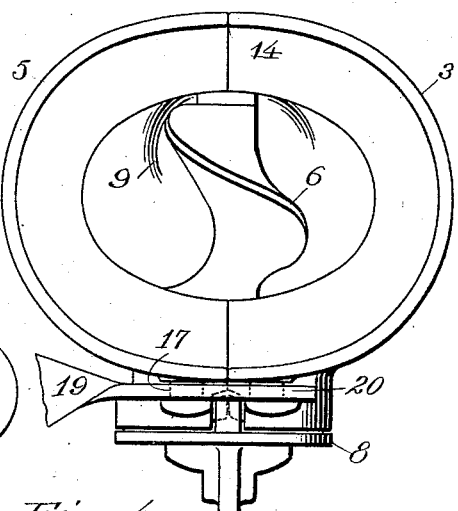
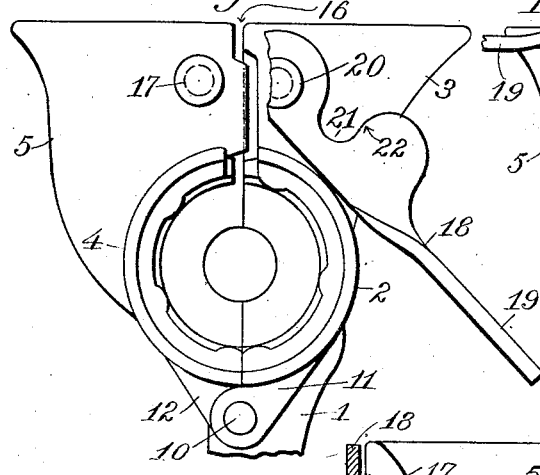
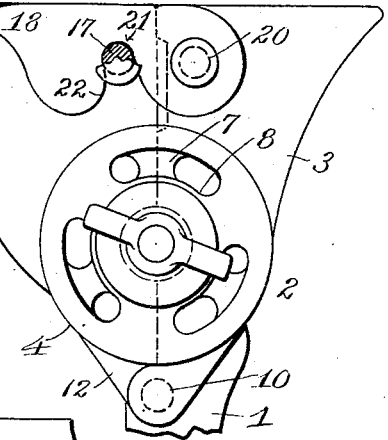
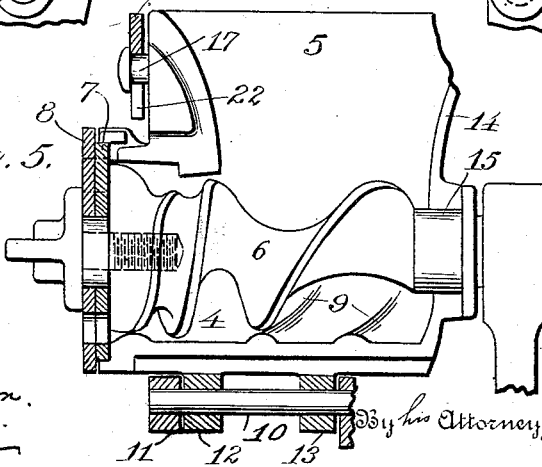
Witnesses:
Florency Jackson
A. Bernstein
Michael A. Rollman
Inventor
By his Attorney Geo. S. Wheelock

UNITED STATES PATENT OFFICE.

MICHAEL A. ROLLMAN, OF MOUNT JOY, PENNSYLVANIA.

FOOD-CHOPPER.

1,068,821.   Specification of Letters Patent.   Patented July 29, 1913.

Application filed October 11, 1911. Serial No. 654,082.

*To all whom it may concern:*

Be it known that I, MICHAEL A. ROLLMAN, a citizen of the United States, residing at Mount Joy, in the county of Lancaster and State of Pennsylvania, have invented new and useful Improvements in Food-Choppers, of which the following is a specification.

This invention relates to improvements in food choppers of that class in which a worm is used to feed the material forward and a pair of cutters are used to cut the material as it is squeezed out by the worm.

In my prior Patent #726,991, a divided casing and hopper with a bail pivoted to both sides of one member of said casing and hopper are disclosed, said bail being adapted to be swung down into inclosing engagement with the other member of the hopper. Under the arrangement there shown, the two members of the casing and hopper abut at both ends of said casing and at both sides of said hopper when the movable member is swung up to using position previous to the locking engagement of said bail, the said bail being employed merely for the purpose of holding the two members together. The strain or pressure of the material which is being fed forward in the casing is in said patented construction taken up by the two pivots of the bail. Under the present invention, however, the parts of the casing and hopper are so combined as to functionate in a peculiar manner and are specially constructed, mounted and latched so that the leverage to lock the members together is all exerted at the cutter end of the casing, and the strain or pressure of the material being fed forward in the casing by the worm is taken up by the latch which is arranged at the cutter end of the casing to one side of the hopper.

The objects of the present invention are therefore to provide a practical, efficient and durable food chopper and to improve upon the construction of food choppers in general.

With these ends in view, my invention consists of certain features of construction to be hereinafter described and then pointed out in the claim with reference to the accompanying drawings showing a suitable embodiment of the invention, and in which—

Figure 1 is a plan of my improved food chopper with the parts in position just before applying the latch to lock them together; Fig. 2 is a plan of the same parts in locked and operative position, with the exception that this view shows the cutter mechanism and worm; Fig. 3 is a side elevation of the parts in the position shown in Fig. 1; Fig. 4 is a side elevation of the parts in the position shown in Fig. 2, a portion of the same being broken away; and Fig. 5 is a section longitudinally through the casing with parts in elevation. In all these views the complete support or standard is omitted.

The support or standard 1 is provided with any well known means for attaching the food chopper to a table. Preferably, but not necessarily, there is formed integrally with the support 1 a hollow casting or member which comprises a half 2 of the cylindrical casing and a half 3 of the hopper. There is also provided another hollow member which comprises the other half 4 of the cylindrical casing and the other half 5 of the hopper. When the said casing and hopper members are suitably constructed and mounted, they provide means for supporting the worm 6 and the cutters 7, 8. Coöperating with the worm, feeding ribs 9 are preferably formed in the casing 2, 4, and the worm may be turned by a suitable crank or other means attached to one end of the worm shaft. At the other end of the worm shaft the cutters 7, 8 are applied, the cutter 7 being suitably fixed against rotation, while the cutter 8 is suitably mounted and clamped on the worm shaft so as to be rotated thereby to coöperate with the stationary cutter 7 and cut up the material which is being discharged by the rotating worm. A further detailed description of the worm and cutters seems unnecessary as the same may be of any obvious and known construction.

Extending transversely from the support 1 parallel with the casing 2, 4 is a pivot pin 10, the outer end of which is secured in an ear or lug 11, which projects from the half casing 2. The said pivot pin 10 is preferably of steel wire of suitable gage, which, while it forms a pivot, is also adapted to laterally yield to pressure to the desired extent. The half casing 4 which carries the half hopper 5 is provided with a pair of ears or lugs 12, 13, which are perforated to receive the pivot pin 10, so that the member 4, 5 constitutes a hinged member and may be swung up into operative position opposite the rigid member 2, 3. The resiliency or yielding character of the pivot pin 10 is taken advantage of in a peculiar manner. To this end the members 2, 3 and 4, 5 are made to abut at the edges 14 located adjacent the crank end of the worm. The said edges constitute stops which extend through the corresponding end of the casing and the corresponding side of the hopper, so that when the hinged member 4, 5 is swung up into operative position it will abut at 14 against the other member 2, 3. Preferably, also, the lower edges of the half casing 2, 4 abut when the hinged member is swung up into operative position. One end of the worm shaft is supported by the stationary cutter 7, while the other end has bearing at 15 at the abutting edges 14 of the two members.

Under the present invention it is not intended that when the hinged member is swung up into operative position before it is locked, that the edges of the two members 2, 3 and 4, 5 abut at that side which is adjacent to the cutters. One of the side edges of one of the two members 2, 3 and 4, 5 is therefore short as compared with the edge of said member at the other side of the hopper, whereby a gap 16 is left at the place indicated, when the hinged member is swung up into operative position. This gap is not closed except by the action of the locking means. The locking means comprises a headed stud 17, which extends from one of the said members at the side nearest the cutters, and also a latch 18 which is provided with a thumb-piece or handle 19 and is located wholly at the same side of the hopper, and is pivoted to the other member at 20. Preferably the said latch is provided with a notch or recess 21, and at that side of said notch remote from the pivot of the latch, with a camming nose or projection 22.

The action is as follows: When the hinged member 4, 5 is swung up into operative position, the edges of the two members remote from the cutters will abut against each other and form stops at 14. The latch is now pressed down so as to cause its camming nose or projection 22 to forcibly engage with the stud 17 and cam it laterally toward the pivot 20 with the result that a leverage is exerted on the yielding or resilient pivot pin 10 at the end near the cutters, while the gap at 16 will be narrowed or closed. The parts of the hopper and casing will thus be bound firmly together and the means affording resistance against the opening or bursting tendency of the two members will be located where it should be, namely, at a point near to the cutters, at that end of the casing where the pressure of the material fed forward is exerted. Whatever be the construction and arrangement of the means for locking the two members together, the pivot pin is to yield and the casing and hopper are to be suitably constructed at that side adjacent the cutters to provide a gap, while the latching means is to be provided with a camming portion to draw the casing and hopper members together at the side only which is adjacent the cutters. Obviously, therefore, the construction shown is susceptible of modification within these limits.

What I claim is:

In a food chopper, the combination of a support, a divided casing and hopper, comprising two hollow members, one of which is rigid with said support, a yielding pivot pin mounted on said support and rigid member, the other member being pivoted on said pin, and the combined hollow members being provided with a bearing for the feed shaft, the edges of said members adjacent to said bearing forming stops when the hinged member is swung to closed position while the edges of said members at the cutter end of the chopper are at that time separated by a gap, a stud projecting from the hopper portion of one of said members at one side of said gap, and a latch having a camming portion and mounted on the hopper portion of the other of said members, said stud being engageable by said camming portion to draw the said gap-separated portions of said members closer together and to latch said members together.

MICHAEL A. ROLLMAN.

Witnesses:
ANNA M. HEISEY,
CHAS. G. DE LONG.

---

Copies of this patent may be obtained for five cents each, by addressing the "Commissioner of Patents, Washington, D. C."